(12) United States Patent
Shahgoshtasbi et al.

(10) Patent No.: US 12,499,311 B2
(45) Date of Patent: Dec. 16, 2025

(54) LANGUAGE MODEL PREPROCESSING WITH WEIGHTED N-GRAMS

(71) Applicant: ServiceNow, Inc., Santa Clara, CA (US)

(72) Inventors: Dariush Shahgoshtasbi, Kirkland, WA (US); Omer Anil Turkkan, Santa Clara, CA (US); Jeevan Anand Anne, Santa Clara, CA (US); Sagar Davasam Suryanarayan, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 320 days.

(21) Appl. No.: 18/117,304

(22) Filed: Mar. 3, 2023

(65) Prior Publication Data

US 2024/0296284 A1    Sep. 5, 2024

(51) Int. Cl.
*G06F 40/284* (2020.01)
*G06F 40/166* (2020.01)
*G06N 20/00* (2019.01)

(52) U.S. Cl.
CPC .......... *G06F 40/284* (2020.01); *G06F 40/166* (2020.01); *G06N 20/00* (2019.01)

(58) Field of Classification Search
None
See application file for complete search history.

(56) References Cited

U.S. PATENT DOCUMENTS

| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |

(Continued)

FOREIGN PATENT DOCUMENTS

| EP | 0433979 A2 | 6/1991 |
| EP | 1607824 A2 | 12/2005 |

(Continued)

OTHER PUBLICATIONS

ServiceNow, Tokyo Now Intelligence, Feb. 20, 2023, downloaded from https://docs.servicenow.com/en-US/bundle/tokyo-now-intelligence/page/administer/natural-language-understanding/concept/natural-language-understanding.html.

*Primary Examiner* — Daniel C Washburn
*Assistant Examiner* — Tyler Becker
(74) *Attorney, Agent, or Firm* — MCDONNELL BOEHNEN HULBERT & BERGHOFF LLP

(57) ABSTRACT

An embodiment may involve: obtaining textual content including a plurality of token strings, wherein each of the plurality of token strings includes one or more tokens; determining, for the plurality of token strings, respectively corresponding sets of n-gram tuples; assigning respective weights to the plurality of token strings, wherein, for each of the plurality of token strings, the assignment is based on the respectively corresponding set of n-gram tuples; identifying a subset of the plurality of token strings, wherein each of the subset of the plurality of token strings is characterized by a respective weight that exceeds a predetermined threshold weight; and storing sets of n-gram tuples respectively corresponding to the subset of the plurality of token strings.

18 Claims, 16 Drawing Sheets

(56) References Cited

U.S. PATENT DOCUMENTS

| | | |
|---|---|---|
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway et al. |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Joe |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B2 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 10,546,154 B2 * | 1/2020 | Praveen ............. G06F 21/6263 |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0145279 A1 * | 7/2003 | Bourbakis ............... G06F 40/20 707/E17.116 |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2018/0123940 A1 | 5/2018 | Rimar |
| 2019/0104398 A1 | 4/2019 | Owen |
| 2020/0050689 A1 | 2/2020 | Tal |
| 2020/0204443 A1 | 6/2020 | Bar Oz |
| 2021/0194764 A1 | 6/2021 | Badyan |
| 2022/0029886 A1 | 1/2022 | Hameiri |
| 2023/0044266 A1 * | 2/2023 | Nguyen ............. G06F 16/90335 |
| 2023/0195735 A1 * | 6/2023 | Al-Qurishi .......... G06F 16/2255 707/728 |
| 2023/0334248 A1 * | 10/2023 | Shahgoshtasbi ...... G06F 40/295 |
| 2024/0256759 A1 * | 8/2024 | Wang .................... G06F 40/284 |

FOREIGN PATENT DOCUMENTS

| | | |
|---|---|---|
| WO | 9934285 W | 7/1999 |
| WO | 0052559 W | 9/2000 |
| WO | 0179970 W | 10/2001 |

* cited by examiner

SELECTED TUPLES

902

('the', 'content', 'of', 'this', 'message')
('content', 'of', 'this', 'message', 'is')
('of', 'this', 'message', 'is', 'the')
('this', 'message', 'is', 'the', 'proprietary')
('message', 'is', 'the', 'proprietary', 'and')
('is', 'the', 'proprietary', 'and', 'confidential')
('the', 'proprietary', 'and', 'confidential', 'property')
('proprietary', 'and', 'confidential', 'property', 'of')
('and', 'confidential', 'property', 'of', 'CompanyA')
('confidential', 'property', 'of', 'CompanyA', 'and')
('property', 'of', 'CompanyA', 'and', 'should')
('of', 'CompanyA', 'and', 'should', 'be')
('CompanyA', 'and', 'should', 'be', 'treated')
('and', 'should', 'be', 'treated', 'as')
('should', 'be', 'treated', 'as', 'such')
('any', 'unauthorized', 'use', 'or', 'distribution')
('unauthorized', 'use', 'or', 'distribution', 'of')
('use', 'or', 'distribution', 'of', 'the')
('or', 'distribution', 'of', 'the', 'content')
('distribution', 'of', 'the', 'content', 'of')
('of', 'the', 'content', 'of', 'this')
('the', 'content', 'of', 'this', 'message')
('content', 'of', 'this', 'message', 'is')
('of', 'this', 'message', 'is', 'prohibited')
('name:', '*')

SELECTED SENTENCES

900

The content of this message is the proprietary and confidential property of CompanyA, and should be treated as such. Any unauthorized use or distribution of the content of this message is prohibited.

Name: John Smith

FIG. 9

LANGUAGE MODEL PREPROCESSING WITH WEIGHTED N-GRAMS

BACKGROUND

Natural language processing (NLP) consists of a set of techniques that allow a computing system to "understand" human language. With these capabilities, the computing system may be able to effectively search large databases of documents, determine the content of such documents, and/or answer questions from or carry out dialogs with human users. A recent example of the importance of NLP is the popularity of large language models (LLMs) that can write essays, poetry, and computer code with remarkable fluency. Thus, NPL is used to solve numerous technical problems where a human language interface is needed or desirable. Nonetheless, like all forms of machine learning, NLP quality and accuracy suffers when it is not provided with sufficiently high-quality training data.

SUMMARY

The embodiments herein overcome these and potentially other technical challenges related to training NLP models. In particular, techniques are disclosed for preprocessing training data to eliminate certain types of redundancies that reduce NLP model accuracy. In the past, such preprocessing was performed on an ad-hoc basis, which limited its efficacy. In these embodiments, the preprocessing is systematic and comprehensive, resulting in the more of the aforementioned redundancies being successfully identified and potentially removed from training data prior to NLP model training.

Accordingly, a first example embodiment may involve obtaining textual content including a plurality of token strings, wherein each of the plurality of token strings includes one or more tokens; determining, for the plurality of token strings, respectively corresponding sets of n-gram tuples; assigning respective weights to the plurality of token strings, wherein, for each of the plurality of token strings, the assignment is based on the respectively corresponding set of n-gram tuples; identifying a subset of the plurality of token strings, wherein each of the subset of the plurality of token strings is characterized by a respective weight that exceeds a predetermined threshold weight; and storing sets of n-gram tuples respectively corresponding to the subset of the plurality of token strings.

A second example embodiment may involve obtaining a token string that includes one or more tokens; determining, for the token string, a set of n-gram tuples; comparing the set of n-gram tuples to sets of predetermined n-gram tuples; determining whether a threshold condition is satisfied based on the comparison, wherein the threshold condition is satisfied when at least a threshold number of the set of n-gram tuples is included in the predetermined n-gram tuples; and classifying the token string into a repetition class or a non-repetition class, wherein classification into the repetition class is based on the threshold condition being satisfied, and wherein classification into the non-repetition class is based on the threshold condition not being satisfied.

A third example embodiment may involve a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9 depicts use of the preprocessing adaptation phase, in accordance with example embodiments.

DETAILED DESCRIPTION

Figure 1:
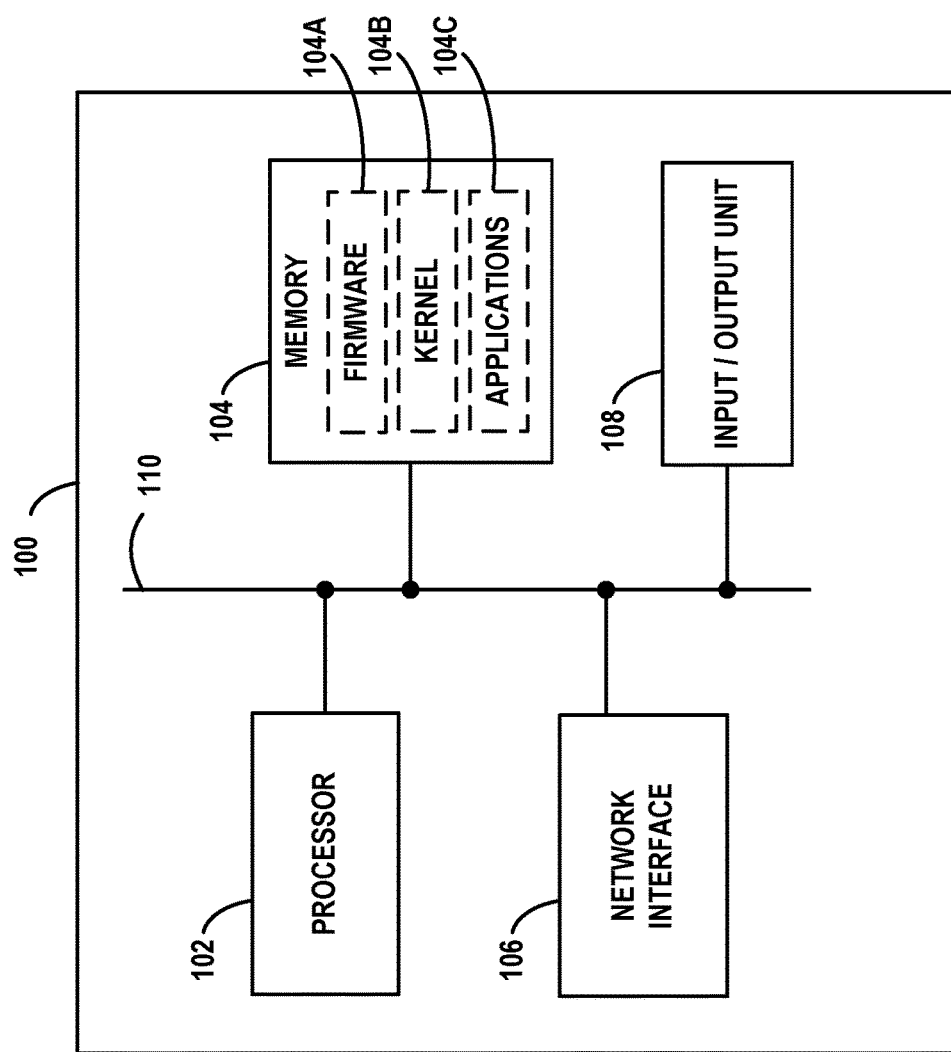
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
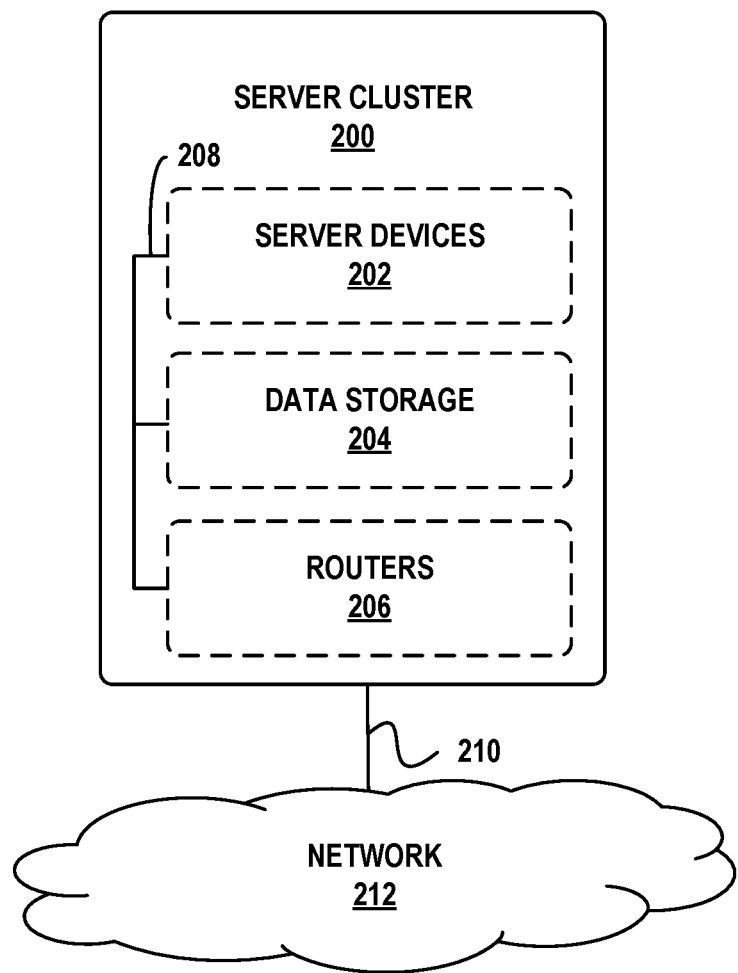
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
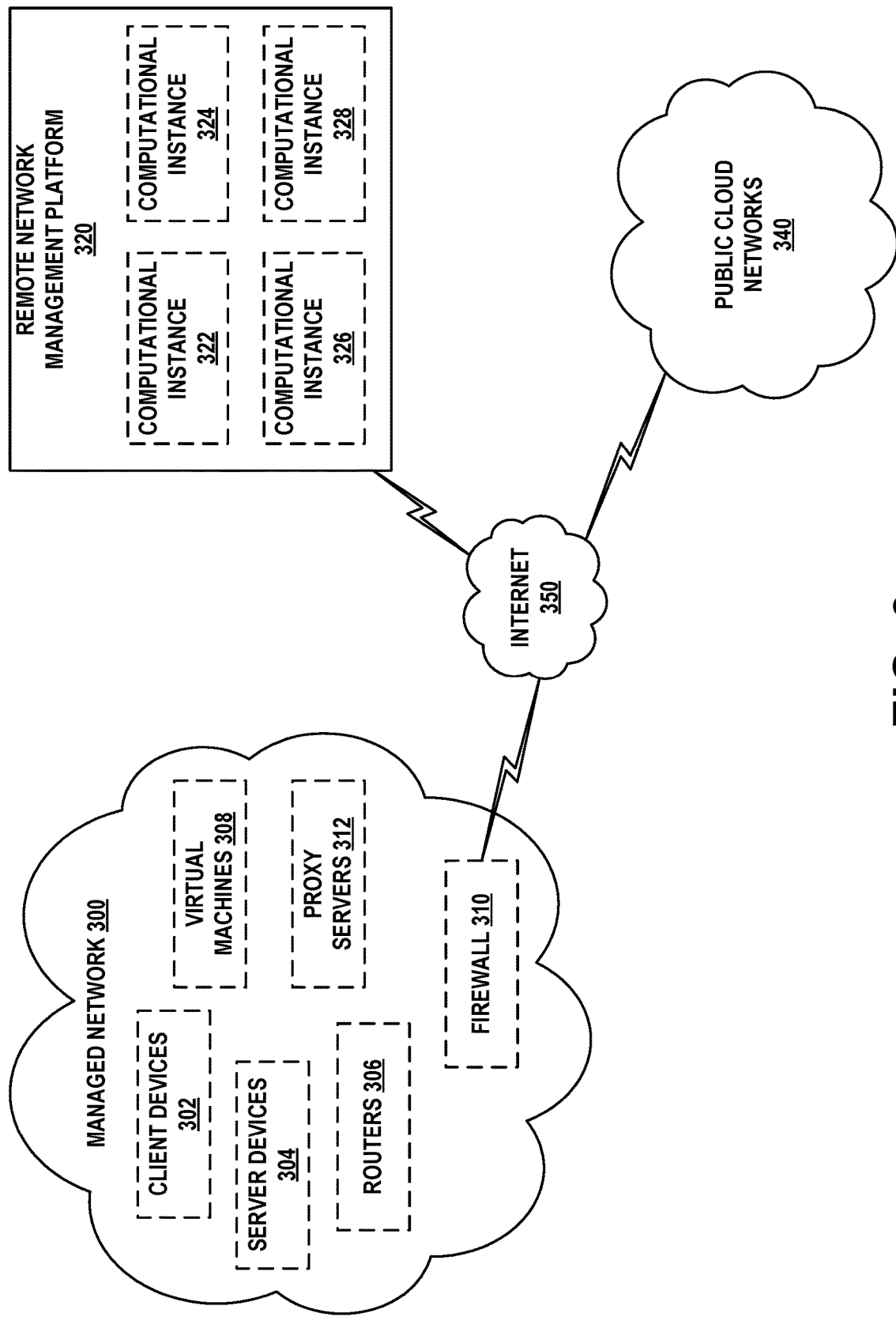
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
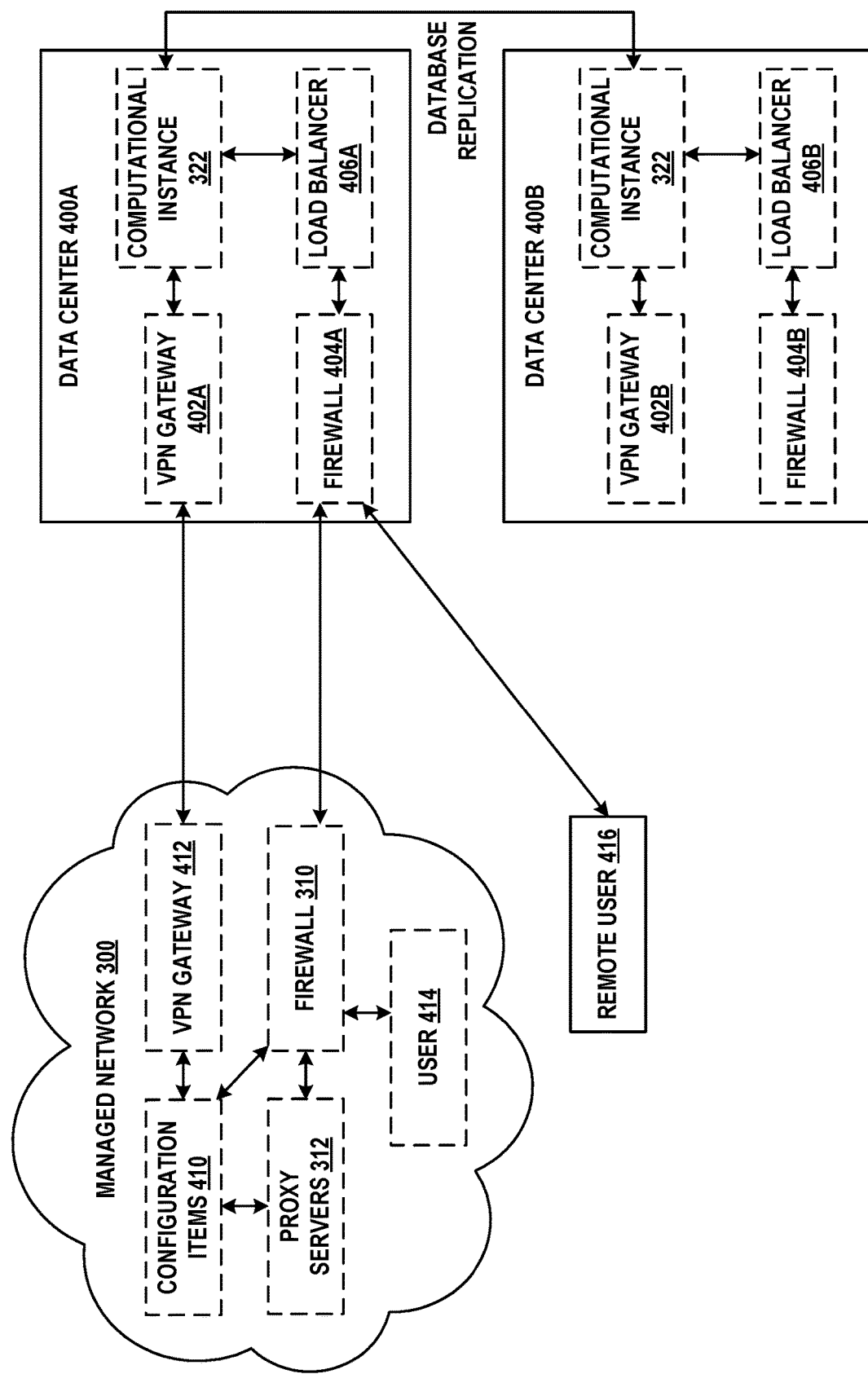
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or if security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
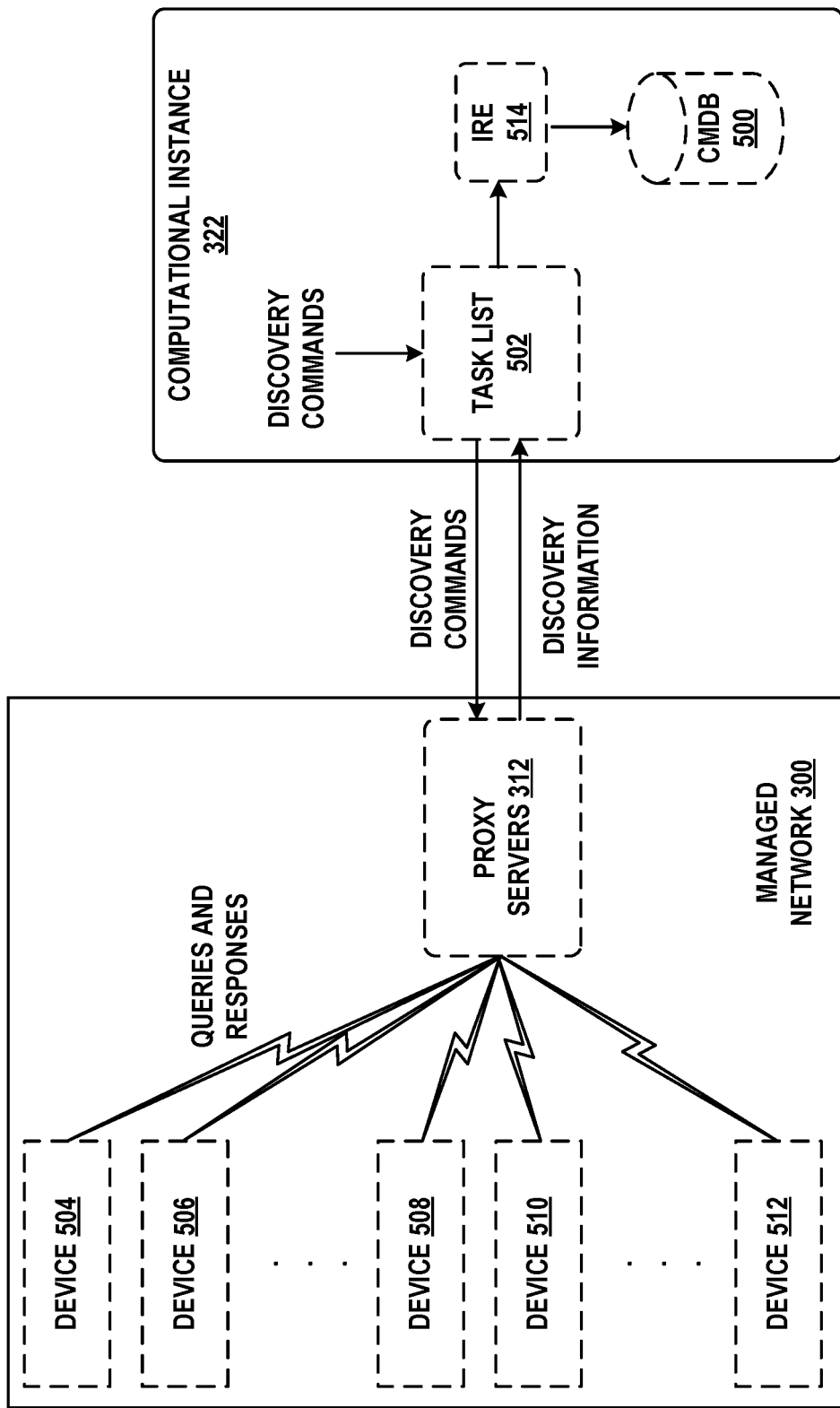
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device.

For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion.

Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Preprocessing of Training Data

Machine learning is a branch of artificial intelligence that focuses on the development of models that can learn patterns and make predictions from data, without being explicitly programmed to do so. A goal of machine learning is to provide models that can generalize to new, unseen data, and make accurate predictions or decisions.

Various types of machine learning techniques exist. In supervised learning, the model is trained on labeled data, where input data is paired with the correct or desired corresponding output. The model learns to recognize patterns and make predictions based on the training data. In unsupervised learning, the model is trained on unlabeled data, where there is no correct output provided. Instead, the model learns to identify patterns and group similar data together. In reinforcement learning, the model learns to make decisions through trial and error. The model receives rewards or punishments based on its decisions, and learns to improve its behavior over time. Other techniques are possible, including hybrid or ensemble models that incorporate aspects of one or more of supervised, unsupervised, and/or reinforcement learning.

Regardless of the type of model, the quality of its output (e.g., predictions) is heavily dependent on the quality of its training data. Training data is typically derived for a corpus of preexisting real-world data. For example, large language models may be trained on the content of text from various public databases (e.g., Wikipedia and/or public social media posts). In the context of a remote network management platform, a natural language model (NLP) model could be trained on the content of a CMDB, a knowledgebase, an incident database, a security vulnerability, an email database, a customer service case database, or some other data source.

But raw training data, if used without preprocessing, tends to result in NLP models that perform poorly in practice. This is often because raw training data includes redundancies, irrelevant content, missing content, inconsistent content, and/or content formatted in a fashion that is difficult to interpret using training. As a consequence, preprocessing of raw training data can be an important step in model development.

The types of preprocessing that can be performed include but are not limited to: (i) removing inconsistencies, duplicates, outliers, and errors, (ii) imputing missing values, (iii) transforming the raw training data into a format that can be easily ingested by the machine learning trainer (e.g., scaling, normalization, and/or encoding), and (iv) augmenting the training data by generating new examples from the existing data.

Once preprocessed, the training data can be split into training, validation, and testing sets. The training set is used to train the model, the validation set is used to tune the hyperparameters of the model (e.g., structure of the model, initial weights, learning rate), and the testing set is used to evaluate the model's performance on new (e.g., unseen) data.

Herein, the terms "natural language processing" and "NLP" are to be interpreted as any type of machine learning (ML) model intended to understand, generate, and/or process human language—in the form of text—with a reasonable degree of accuracy. Nonetheless, the remaining description uses the terms "machine learning" and "ML" to incorporate other types of models that may also benefit from the processing improvements described herein. Additionally, while these models may utilize textual input and/or produce textual output, the input text may be generated from corresponding audio of spoken voices (e.g., by way of a speech-to-text converter) and the output text may be used to produce corresponding spoken audio (e.g., by way of a text-to-speech converter).

Figure 6:
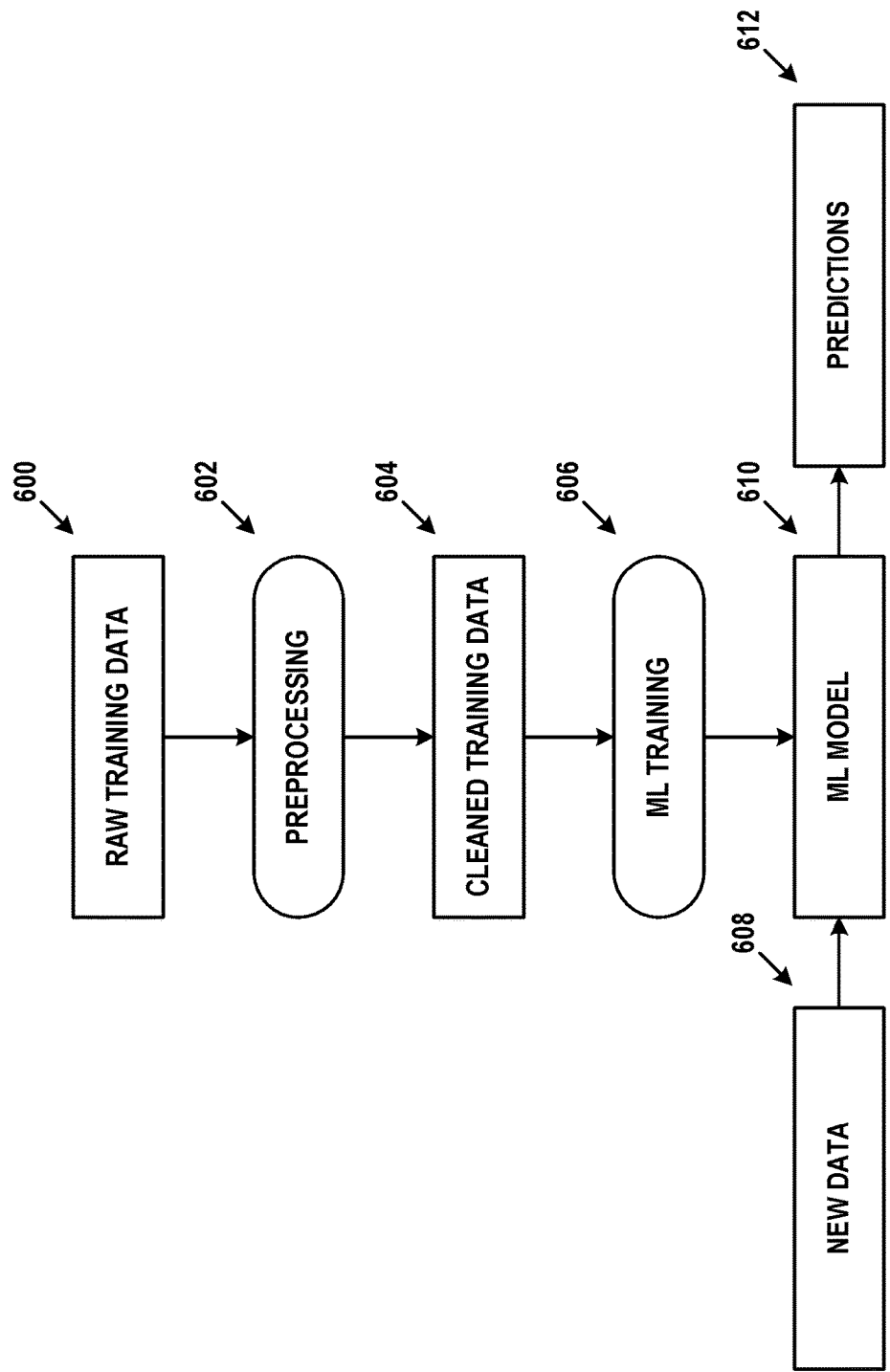
FIG. 6 depicts preprocessing of training data and training of a machine learning model, in accordance with example embodiments.

FIG. 6 depicts example preprocessing and training techniques. In general, data in FIG. 6 is depicted in rectangles and processing steps are depicted in ovals. The exception is for machine learning (ML) model 610 where the model includes data (e.g., weights and/or biases) but is also executable to make predictions.

Raw training data 600 may be obtained in various ways (e.g., gathered from a corpus of documents, read from a database, and/or via an Internet search). Preprocessing step 602 takes raw training data 600 and produces cleaned training data 604. As noted above, this step may involve removing, imputing, transforming, and/or augmenting raw training data 600. ML training step 606 takes cleaned training data 604 and trains ML model 610. ML model 610 can be executed on new data 608 to produce predictions 612.

As a concrete example, suppose that an email database contains the text from a large number of email messages (e.g., thousands, tens of thousands, millions, etc.). It may be desirable to be able to search this database to identify emails that were part of different threads or conversations but have similar content. Thus, raw training data 600 may be the email messages, preprocessing step 602 may refine the text from these messages to form cleaned training data 604, a unsupervised similarity-based ML model 610 may be trained during ML training step 606, and then this model can be deployed. It would receive a new email message 608 and provide a list or one or more similar email messages 612 (perhaps with a degree of confidence in the accuracy of its predictions).

As another example, suppose that an incident database contains the text from a large number of trouble tickets opened by technology users (e.g., customers or employees of an enterprise). It may be desirable to be able to use this database to automatically flag new incidents that are critical and thus should receive immediate attention (e.g., a system-wide outage of a service). Thus, raw training data 600 may be the incidents, preprocessing step 602 may refine the text from these incidents to form cleaned training data 604, a supervised criticality detecting ML model 610 may be trained during ML training step 606, and then this model can be deployed. It would receive a new incident 608 and provide a prediction 612 of whether the new incident describes a critical issue (again, perhaps with a degree of confidence in the accuracy of its prediction).

The embodiments herein generally focus on technical improvements made to preprocessing step 602. Prior art techniques lack flexibility and accuracy in how preprocessing is performed-notably, in their poor ability to detect (and possibly remove or disregard) duplicate training data that often—in practice-confounds ML models. As a consequence, ML models trained using these techniques have limited prediction accuracy.

In contrast, the embodiments herein use, during preprocessing, a new type of preprocessing model that is adapted detect repetitious training data in a more accurate and reliable fashion than prior techniques. Once detected, such repetitions can be labeled for special processing. This special processing might include removing the repetitions from the training data or giving the repetitions a lower weight than other training data. Thus, the prediction accuracy of ML models is improved when trained with data that has undergone the enhanced preprocessing of this model.

Figure 7:
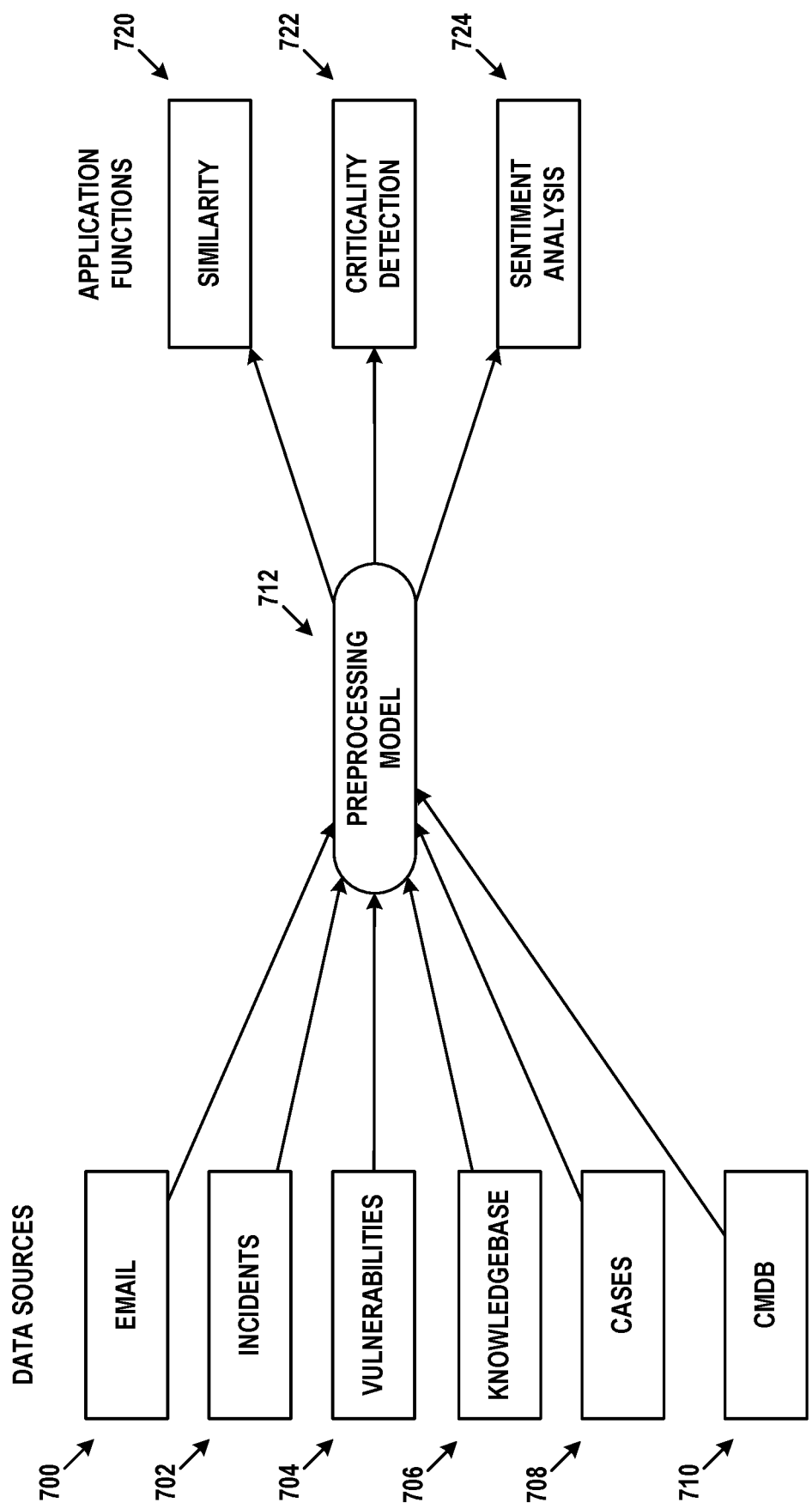
FIG. 7 depicts data sources and application functions that could benefit from enhanced preprocessing, in accordance with example embodiments.

These improvements can be used in a number of environments. As shown in FIG. 7, data sources (e.g., databases) that contain raw training data (e.g., text) include email 700, incidents 702, vulnerabilities 704, knowledgebase 706, cases 708, and CMDB 710, just to name a few. The application functions that can be improved through use of preprocessing model 712 (which is akin to preprocessing 602 but employs the embodiments herein) include those of similarity 720, criticality detection 722, and sentiment analysis 724, among others. Software applications may incorporate, call, or remotely access one or more of these application functions.

For sake of illustration, each of these data sources and application functions are described below. But these descriptions are non-limiting and other descriptions may apply.

Email 700 may include a number of email messages. Each message may include headers indicating a sender, recipient and subject of the email, among other possibilities. Each message may also include a body containing one or more of a greeting, a main message, a closing, and/or a signature.

Some emails may include boilerplate security messages, disclaimers, or warnings that are automatically added thereto.

Incidents 702 may include a number of incidents, each relating to a problem, query, or issue impacting one or more IT users. For example, an incident may specify a unique number, a short description, long description, priority level, to whom it is assigned, an activity log, current status, and/or a resolution.

Vulnerabilities 704 may include a number of security vulnerabilities that have been detected on a computing device or in a network. Each vulnerability may specify a unique number, a description, a severity level, impacted devices or systems, to whom it is assigned, an activity log, and/or current status.

Knowledgebase 706 may contain one or more articles that are intended to capture and share knowledge within an organization or between organizations and/or individuals. The content of a knowledgebase article may include a title, a summary, the main content (body) of the article, one or more examples, a date, and/or attribution.

Cases 708 may contain one or more entries related to a specific user's inquiry, request, or issue. The content of a case may include a unique number, name and contact details for the user, description of the issue, a current status, to whom it is assigned, a priority, an activity log, and/or a resolution.

CMDB 710, as noted above, is a database that contains information about configuration items and potentially other assets within an IT environment. A CMDB acts as a single source of truth for IT service management, providing a centralized repository of data that can be used to manage and automate IT processes. Entries in a CMDB may include configuration items (each potentially including a number of attributes), relationships between configuration items, service mapping information relating configuration items to services they provide, asset management data, and/or change management data.

Similarity functions 720 can be used to measure the similarity or dissimilarity between two or more text documents based on their content. These functions can be used in tasks such as document clustering, topic determination, and information retrieval. Examples of similarity functions may involve cosine similarity (calculating the cosine of the angle between two vectors representing the documents in a high-dimensional space), Euclidean distance (calculating the length of the shortest line between two vectors representing the documents in a high-dimensional space), or Jaccard similarity (calculating the similarity between sets of words in the documents).

Criticality detection functions 722 can employ supervised or unsupervised learning to identify the level of importance or criticality of different sections of text in a document. These functions can be keyword-based (identifying important words or phrases in the text that are associated with specific topics or concepts that are designated as important), based on text length and structure (analyzing the length and structure of a section of text to infer that longer sections or those with more complex syntax and grammar are important), and/or based on topic modeling (identifying topics or themes in the text and then using these topics to determine the criticality of the text).

Sentiment analysis functions 724 can be used to identify and classify the sentiment expressed in text, for example, automatically analyzing and categorizing text as positive, negative, or neutral based on the emotions, opinions, and attitudes conveyed in the text. These functions are typically trained in a supervised fashion with labeled data. The output of a trained sentiment analysis model can be a probability score for each sentiment category, indicating the likelihood that the text belongs to each category. In some cases, a model may also output a sentiment score that represents the strength of the sentiment expressed in the text.

As noted, each of these functions may involve training one or more machine learning models based on data from one or more of the data sources. The trained models may be incorporated into higher-layer applications and/or available by way of an application programming interface (e.g., function call, REST call, etc.).

The embodiments herein involve ways of training preprocessing model 712 to perform certain preprocessing tasks more effectively. For example, in email and incident data sources (as well as possibly other data sources), repetitious text can be problematic for ML models if they are not removed from training data.

One type of repetition is boilerplate text, which can include specific words and/or sequences of words that are added to many email messages or incidents either manually by users or automatically by a system. An example might be a disclaimer or notice added to all outgoing email messages by an email server. Such a disclaimer might be, "Information on past performance, where given, is not necessarily a guide to future performance", while a notice could be, "If you are not the intended recipient and have received this message in error, please delete this message from your computer system and notify me immediately by reply e-mail." Other forms of boilerplate text may be individual words or short phrases, such as "Regards", "Best regards", "Hi", "Hello", and "Thanks".

The problem with boilerplate text is that it often appears verbatim in a large percentage of email messages and incidents (because it may be automatically inserted therein), and thus it reduces the accuracy of certain types of ML models trained on email incidents and messages. For example, if a corpus of email messages are mostly short, the boilerplate text may encompass a majority of the words in each message. As a result, the ML models are overfit to the boilerplate text and underfit to the text that is actually relevant to the intended operation of these models.

This could cause similarity functions 720 (if they are provided with these messages as training data) to mistakenly categorize most or all of the messages as being similar to one another, even though the boilerplate text is not content of interest to the end user or application. Put another way, the repetition can cause an ML model to be unable to generalize to new (unseen) data. As a result, the accuracy of any predictions made by similarity functions 720 would be reduced. In extreme cases, the accuracy would be so low as to render the predictions useless.

This could also cause criticality detection functions 722 (if they are provided with these messages as training data) to mistakenly flag non-critical messages as being critical. For instance, suppose that the boilerplate text includes the phrase "For urgent matters, please contact our help desk as help@company.com". If criticality detection functions 722 are trained to put a significant amount of weight on the presence of keywords like "urgent" to determine the criticality of messages, these models will likely label most or all messages containing this boilerplate text as urgent even though it is likely that few of the messages reflect an urgent request.

The presence of repetitions can also degrade the performance of sentiment analysis functions 724 for similar reasons. For instance, the repetitions may skew any detected sentiment of the messages as a whole toward that of the repeated text.

Another type of repetitious text is form text. Types of form text include key-value pairs that can be expressed in various ways (e.g., plain text separated by colons, XML, JSON, comma separated values, and so on). One possible example is a key and value separated by a colon (or another type of character-based or string-based delimiter) in a text file, such as "Name: John Smith" and "Location: San Francisco". In these key-value pairs, the keys may be repeated across a large number or all email messages or incidents but the values may differ. Nonetheless, the information in key-value pairs within training data is frequently of low relevance to the goals of ML models derived from this training data. In other words, the key-value pairs often should be labeled as repetitions and possibly removed from the training data. Since values may differ for the same key, a wildcard or mask can be used to effectively ignore the value and consider only the key when determining whether the key-value pair is repeated. Alternatively, some embodiments may involve masking the key instead of the value, or leaving the entire key-value pair unmasked.

Details of the adaption and execution phases of preprocessing model 712 are provided in more detail below. Regardless, these embodiments provide a technical solution to a technical problem. One technical problem being solved is that of ML models performing poorly when trained with raw data from data sources that contain certain types of repetition (e.g., boilerplate text and/or form text). In practice, these repetitions can be difficult to detect.

In the prior art, simple filters were put in place to detect and remove specific fixed strings of text from training data. However, these fixed filtering techniques do not scale because each filter needs to be carefully designed in a domain-specific fashion (e.g., filters that work well for the data within one data source or computational instance, might suffer from inferior performance when applied to different data within another data source or computational instance). In practice, there is no universal set of filters that can be used to accurately detect textual repetitions in all data sources. Moreover, design of such fixed filters relies on subjective decisions and experiences of those responsible for the design, which leads to wildly varying outcomes from instance to instance. Thus, prior art techniques did little if anything to address repeated boilerplate text and/or form text in an effective fashion.

The embodiments herein overcome these limitations by adapting preprocessing model 712 dynamically based on the textual content of the relevant data sources. In this manner, repeated boilerplate and form text that is unique or custom to each data source can be discovered and labeled in a more accurate and robust fashion. This results in several advantages. First, ML models trained using these embodiments have better accuracy and efficacy. Second, since more repeated text is removed from the training data than would happen if prior art techniques were employed, memory used to store the training data is reduced. Third, since the computational expense of performing ML predictions (e.g., with one or more of the application functions of FIG. 7) scales with the extent of text being considered, removing more repeated text from consideration can reduce the computational resources needed (e.g., processor load) to train ML models and to perform such ML predictions. Fourth, state of the art language models (e.g., built upon artificial neural networks and/or transformers) tend to suffer from limited performance when input at prediction time is more than 500-1000 words. Thus, eliminating redundancies helps reduce the number of words in input text to be within (or at least closer to) this range. Other technical improvements may also flow from these embodiments, and other technical problems may be solved.

VII. Preprocessing Adaptation Phase

Figure 8:
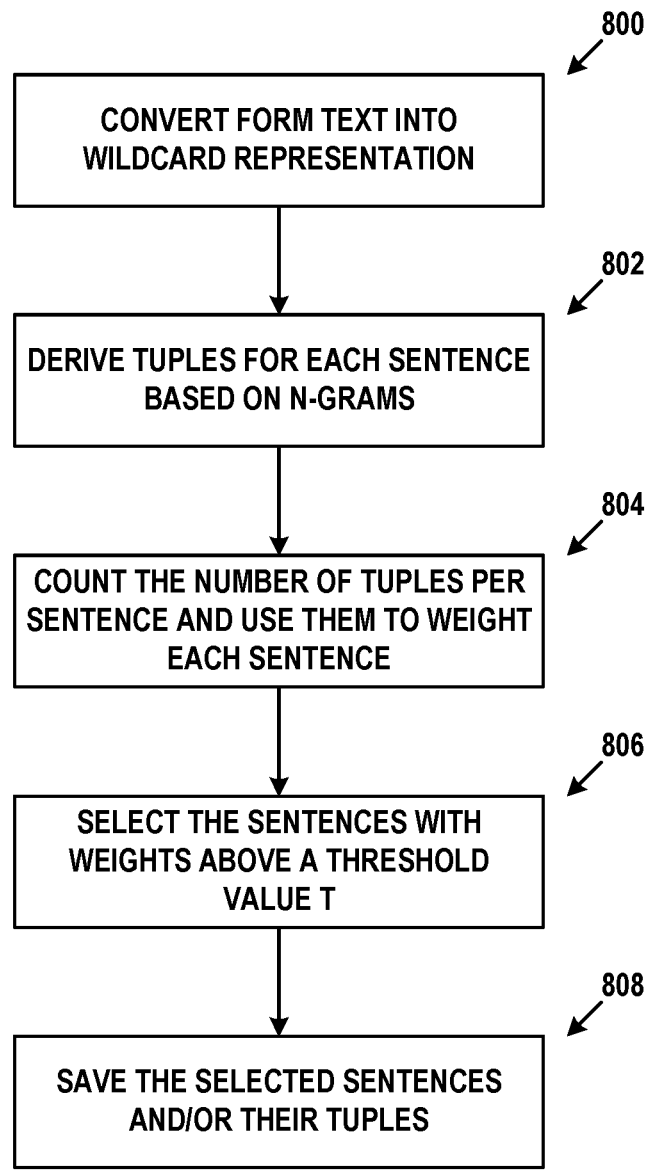
FIG. 8 depicts steps of a preprocessing adaptation phase, in accordance with example embodiments.

FIG. 8 depicts the preprocessing adaptation phase. This phase "trains" the preprocessor on the content of one or more data sources so that the preprocessor can identify certain types of repetitions. In some embodiments, this may involve performing the preprocessing adaptation phase for some or all documents or entries in the data source (e.g., all email messages in email 700 or a random 50% of all incidents in incidents 702).

Block 800 may involve converting form text into wildcard representation. As noted above, form text may appear in various types of arrangements (e.g., plain text separated by colons, XML, JSON, comma separated values, and so on). In the case of plain text separated by colons, the converting may involve replacing the value with a wildcard (e.g., a "*" or some other character-based or string-based indicator). Nonetheless, the converting could also involve relating the key with a wildcard. Other conversion procedures may involve specifying one or more keys or combinations or keys and values for which conversion is skipped (thus leaving these key-value pairs as is).

Block 802 may involve deriving tuples for each sentence based on n-grams. In NLP, n-grams refer to a contiguous sequence of n tokens from a given sample, where the tokens can be phonemes, syllables, letters, or words for example. In the embodiments herein, words are assumed for purposes of simplicity, but other types of tokens could be used instead. The value of n is variable and could be of anything between 2 and 10 for example, but other values could be used instead. For purposes of determining what constitutes a sentence, one possible definition is any sequence of one or more tokens followed by a period. But in some types of source data, newline characters ("\n") or some other delimiter could be used instead of periods. Notably, form text is typically delimited by newline characters rather than periods.

To further illustrate this step, suppose that n is 5 and a data source contains the sentence "Information on past performance, where given, is not necessarily a guide to future performance." In this case, the following tuples are formed:

('Information', 'on', 'past', 'performance', 'where')
('on', 'past', 'performance', 'where', 'given')
('past', 'performance', 'where', 'given', 'is')
('performance', 'where', 'given', 'is', 'not')
('where', 'given', 'is', 'not', 'necessarily')
('given', 'is', 'not', 'necessarily', 'a')
('is', 'not', 'necessarily', 'a', 'guide')
('not', 'necessarily', 'a', 'guide', 'to')
('necessarily', 'a', 'guide', 'to', 'future')
('a', 'guide', 'to', 'future', 'performance')

Note that punctuation marks, such as comma and periods, were removed when forming the tuples. Whitespace may be similarly ignored. In some embodiments, stop words (common words that supply little meaning, such as "a", "an", "and", and "the") may also be removed.

Block 804 may involve counting the number of tuples per sentence and then using them to respectively weight that sentence. For the example above, the sentence "Information on past performance, where given, is not necessarily a guide to future performance" has resulted in 10 tuples being generated. Thus, a weight of 10 is associated with this sentence. In general, the weight for a sentence with m tokens will be m+1−n when m>n and 1 otherwise (in the case where m<n, all m tokens will be placed in a single tuple). Notably, other weighting techniques may be used.

Block 806 may involve selecting the sentences with weights above a threshold value t. In various embodiments, t could be any value of 2 or more (e.g., 2, 3, 5, 10, etc.). Block 808 may involve saving the selected sentences and/or their tuples to volatile or non-volatile memory (e.g., to a save file, which may also be referred to as a preprocessor configuration file). This saved information may later be used in the preprocessing execution phase (described below).

FIG. 9 provides further example of the preprocessing adaptation phase. Selected sentences 900 consists of three sentences that have been selected for preprocessing. Here, it is assumed that the n-gram tokens are words and that n is 5. The first sentence has a length of 19 and a weight of 15. The second sentence has a length of 13 and a weight of 9. The third sentence has a length of 3 and a weight of 1. For sake of illustration, it is assumed that t is set to 1 or 0. The tuples for these sentences are shown in selected tuples 902. Notably, in this embodiment, whitespace and punctuation is ignored and capital letters are converted to lowercase.

VIII. Preprocessing Execution Phase

Figure 10:
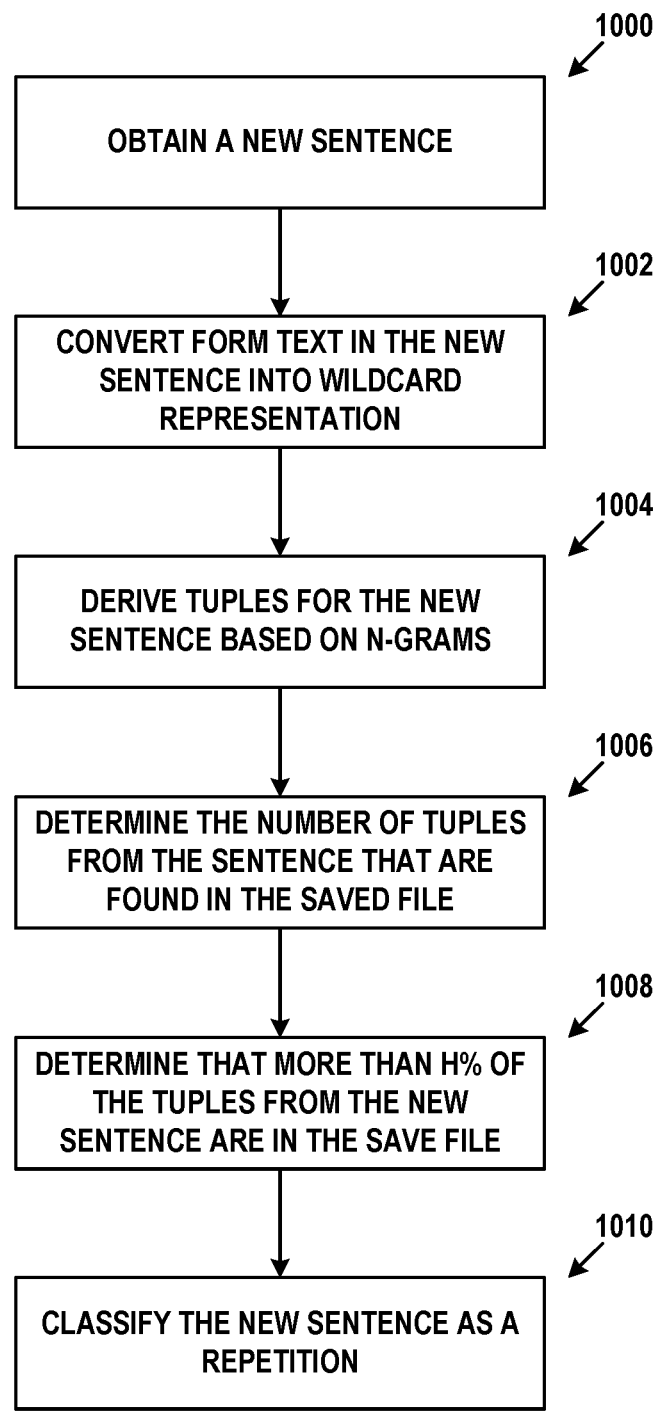
FIG. 10 depicts steps of a preprocessing execution phase, in accordance with example embodiments.

FIG. 10 depicts the preprocessing execution phase. This phase uses the adapted ("trained") preprocessor to classify new (unseen) text as either repetitions or non-repetitions. In some embodiments, this may involve performing the preprocessing execution phase for some or all sentences in training data that is intended to be used to train an ML model. Nonetheless, the examples given illustrate this process for a single new sentence for purposes of simplicity.

Block 1000 may involve obtaining a new sentence (i.e., from the training data). As noted, a sentence may be defined as any sequence of one or more tokens (e.g., words) followed by a period or other pre-established delimiter.

Block 1002 may involve converting form text from the new sentence into wildcard representation according to any of the techniques described herein or other techniques. For purposes of illustration, plain text separated by colons is assumed and the converting involves replacing the value of various key-value pairs with a wildcard (e.g., a "*" or some other indicator).

Block 1004 may involve deriving tuples from the new sentence as converted based on n-grams. The details of this block are similar to those of block 802.

Block 1006 may involve determining the number of tuples derived from the sentence that can be found in the save file. Here, the save file is any structure or repository in volatile or non-volatile memory that contains the tuples that resulted from the preprocessing adaptation phase.

Block 1008 may involve determining that more than h percent of the tuples derived from the new sentence are in the save file. Here, h may be configurable and take on values from 50% to 90%, for instance. In the examples herein, a value of 60% is used for h. In general, this block involves determining whether the new sentence is close enough to sentences identified as repetitions by comparing their respective tuples. The more tuples in common, the more likely the new sentence is close enough.

Block 1010 may involve classifying the new sentence as a repetition based on more than h percent of the tuples derived from the new sentence being in the save file. Once classified as a repetition, the new sentence may be removed from the training data or given a lower emphasis (e.g., weight) during training.

Figure 11A:
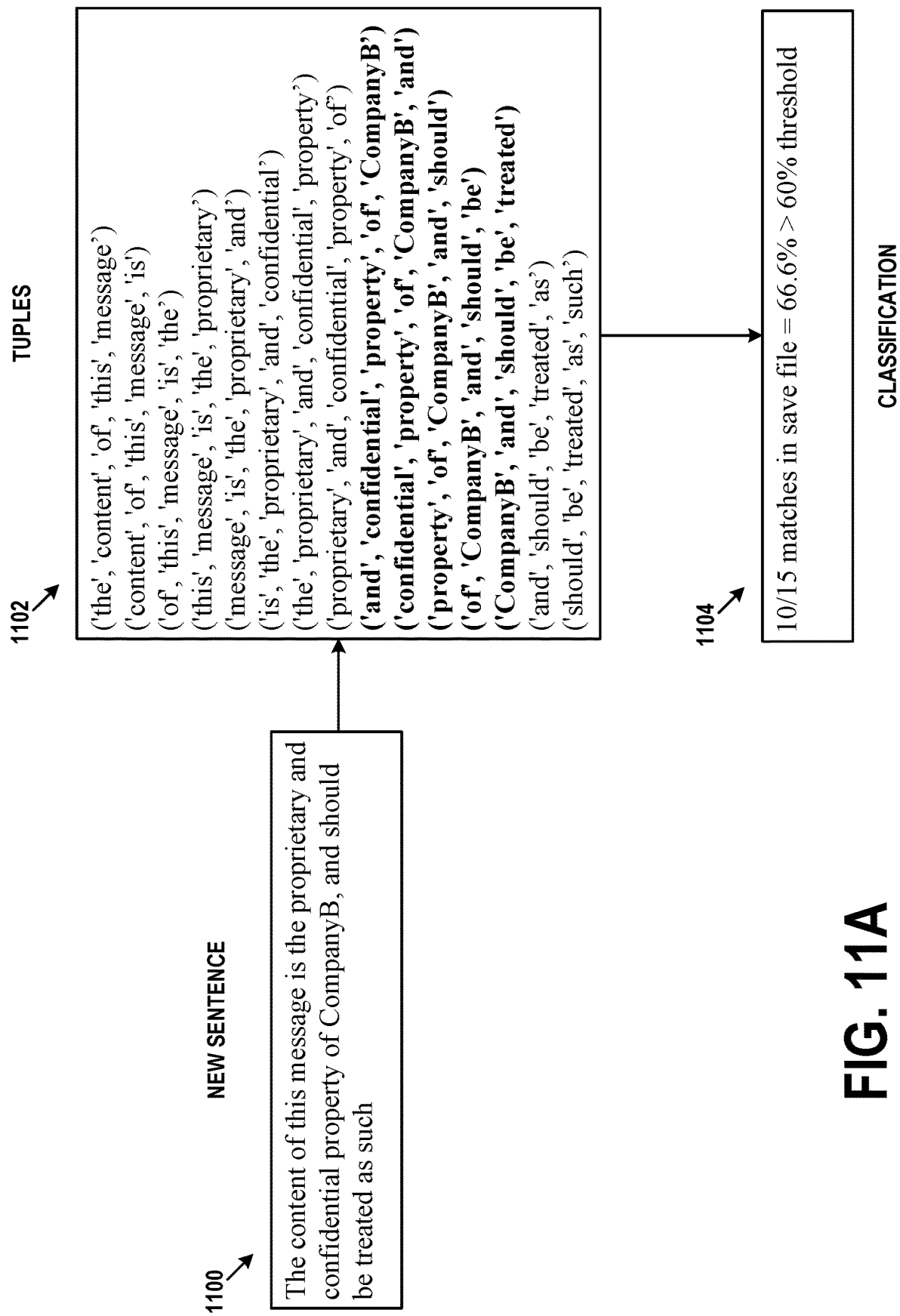
FIGS. 11A, 11B, and 11C depict use of the preprocessing execution phase, in accordance with example embodiments.
Figure 11B:
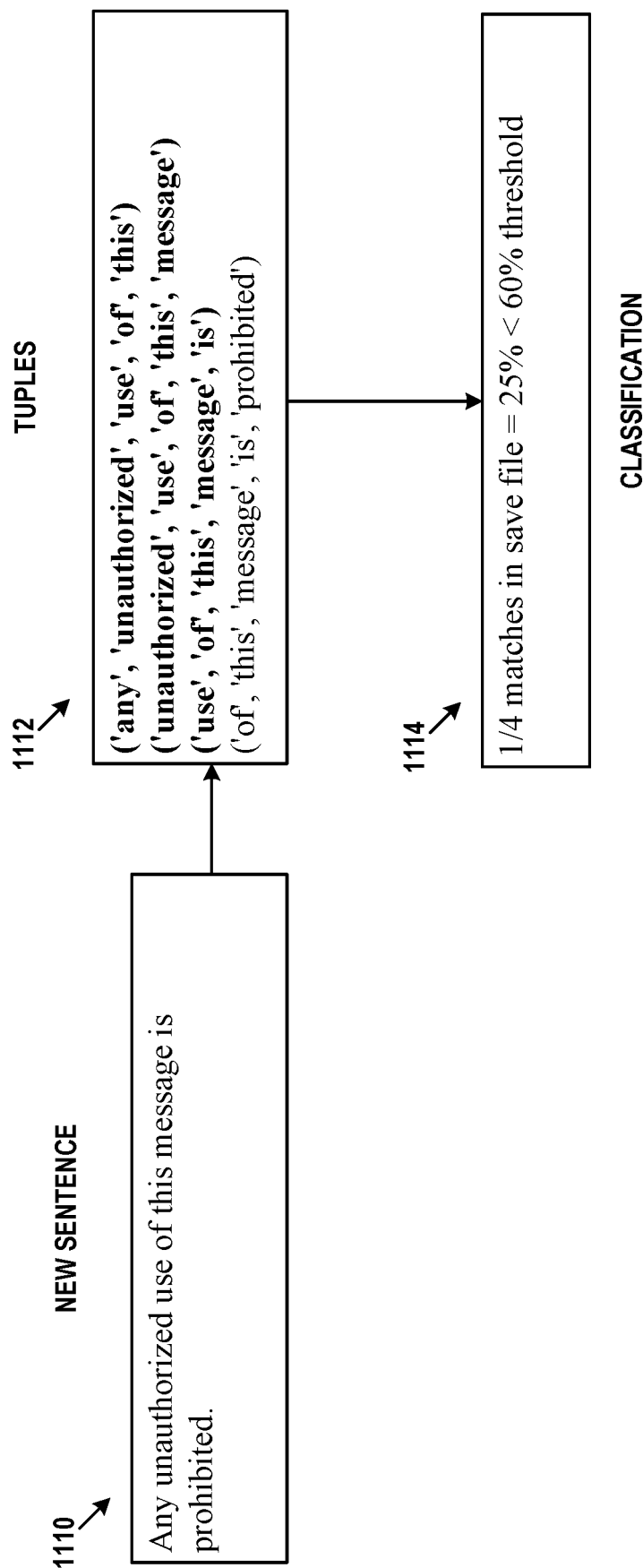
Figure 11C:
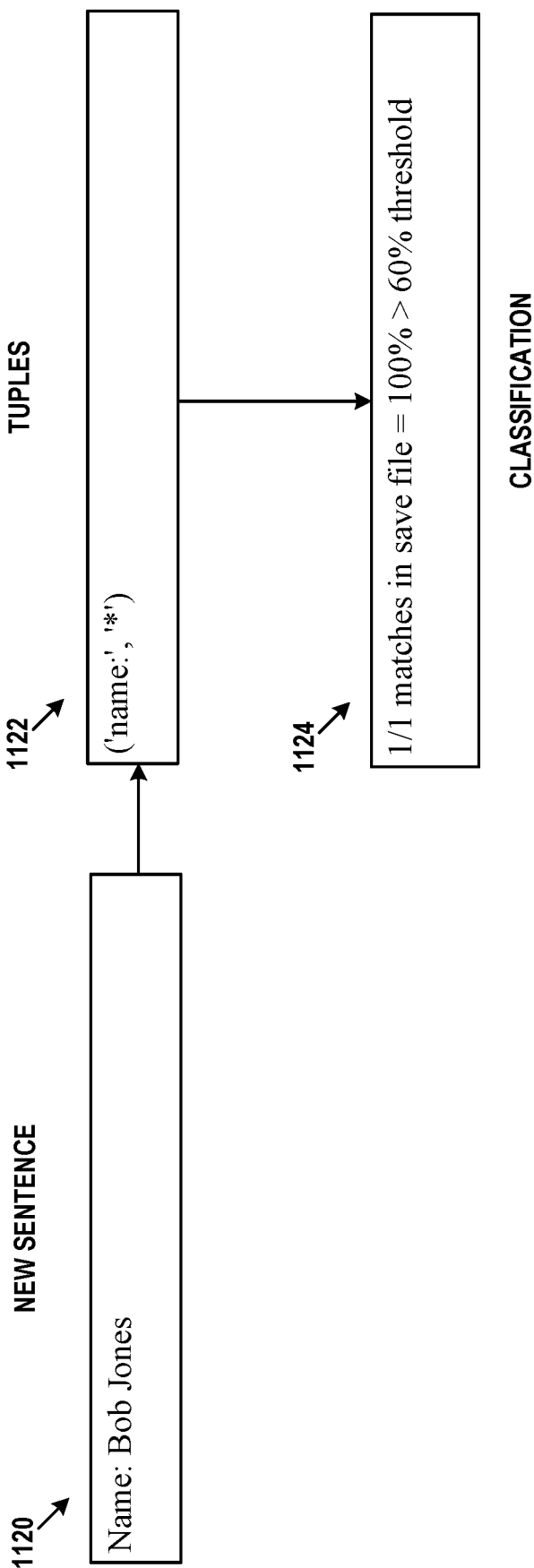

FIGS. 11A, 11B, and 11C provide examples of the preprocessing execution phase for different sentences of a set of training data. These examples assume that the preprocessing adaptation phase has already occurred and resulted in selected tuples 902 being stored in a save file, and that h is 60%.

In FIG. 11A, new sentence 1100 goes through the procedures of block 1004, with the result being tuples 1102. Of these 15 tuples, 10 can be found in the save file (i.e., in selected tuples 902). The 5 tuples that cannot be found in the save file are shown in bold. Classification 1104 shows that 10/15=66.6% of the tuples derived from new sentence 1100 are matched, which exceeds the threshold of 60%. Therefore, new sentence 1100 may be identified as a repetition and possibly removed from the training data.

In FIG. 11B, new sentence 1110 goes through the procedures of block 1004, with the result being tuples 1112. Of these 4 tuples, 1 can be found in the save file (i.e., in selected tuples 902). The 3 tuples that cannot be found in the save file are shown in bold. Classification 1114 shows that 1/4=25% of the tuples derived from new sentence 1110 are matched, which does not meet the threshold of 60%. Therefore, new sentence 1110 may be identified as a non-repetition and possibly maintained in the training data.

In FIG. 11C, new sentence 1120 goes through the procedures of block 1002 because it contains form text. Thus, the string "Bob Jones" is replaced with the wildcard "*" New sentence 1120 also goes through the procedures of block 1004, with the result being just one tuple in tuples 1122. This single tuple can be found in the save file (i.e., in selected tuples 902). Classification 1124 shows that 1/1=100% of the tuples derived from new sentence 1120 are matched, which exceeds the threshold of 60%. Therefore, new sentence 1120 may be identified as a repetition and possibly removed from the training data or given a lower emphasis (e.g., weight) during training.

Figure 12:
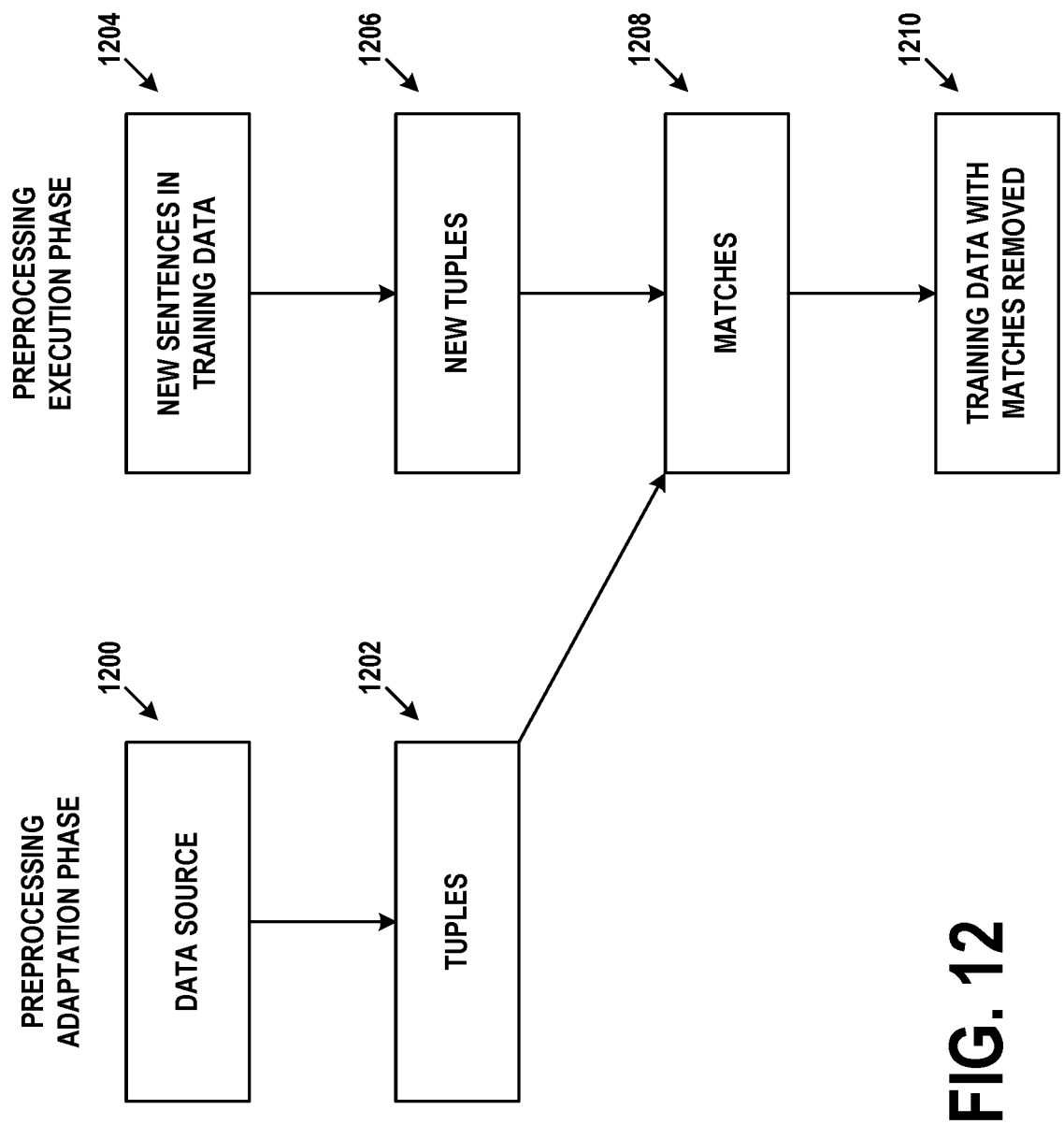
FIG. 12 depicts a relationship between the preprocessing adaptation phase and the preprocessing execution phase, in accordance with example embodiments.

For sake of providing further clarity, FIG. 12 depicts a relationship between the preprocessing adaptation phase and the preprocessing execution phase. As noted, the preprocessing adaptation phase takes the content of data source 1200 as input and produces tuples 1202. Then, for new sentences 1204 from training data that are preprocessed during preprocessing execution phase, each are converted to respective sets of new tuples 1206. Matches 1208 are identified between each of the new tuples derived from new sentences 1204. These matches are then used, as discussed in the context of blocks 1006, 1008, and/or 1010, to classify each of new sentences 1204 as a repetition or as a non-repetition. Any of new sentences 1204 classified as a repetition may be removed from the training data, resulting in training data with matches removed 1210.

IX. Example Operations

Figure 13A:
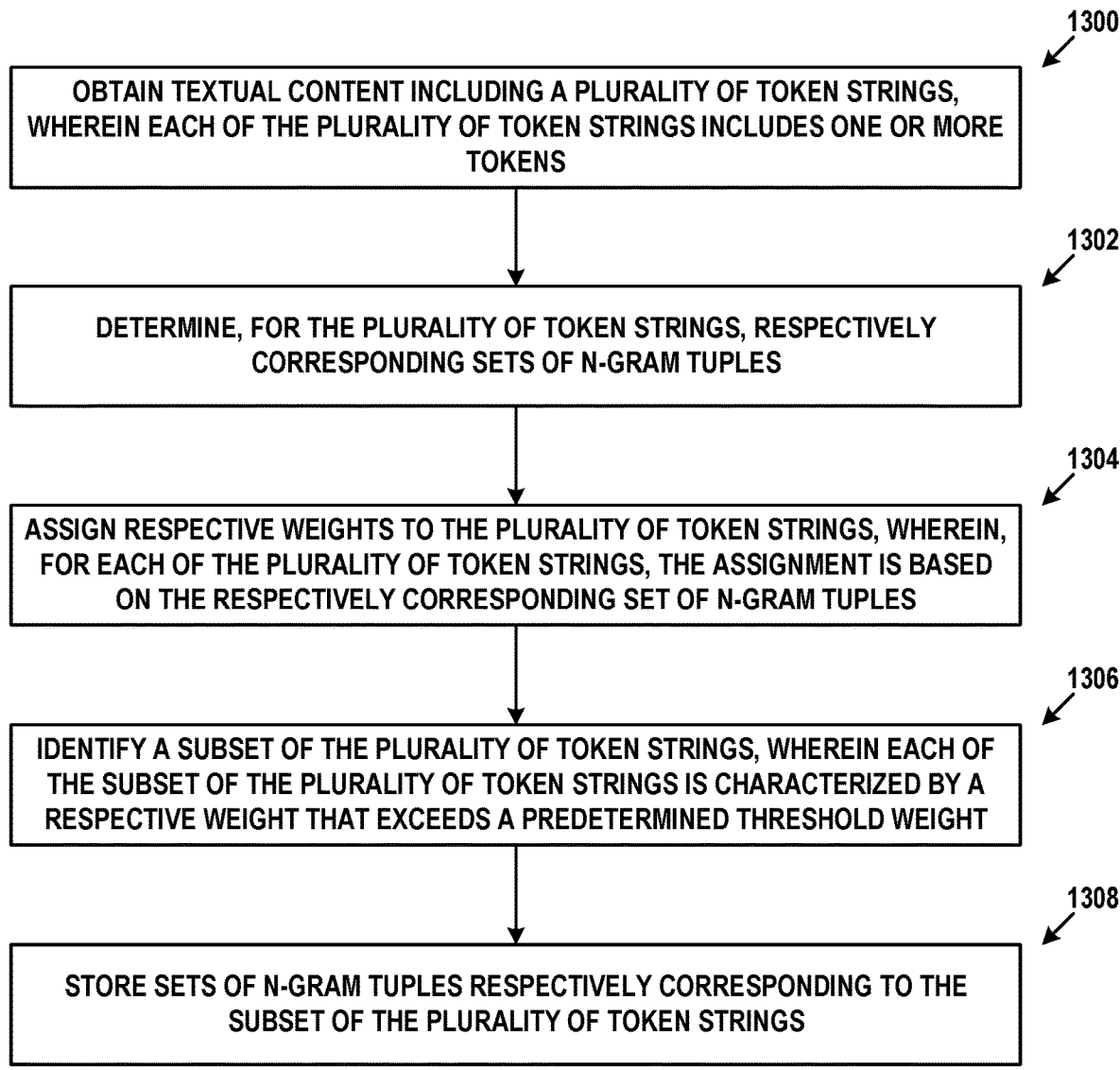
FIG. 13A is a flow chart, in accordance with example embodiments.
Figure 13B:
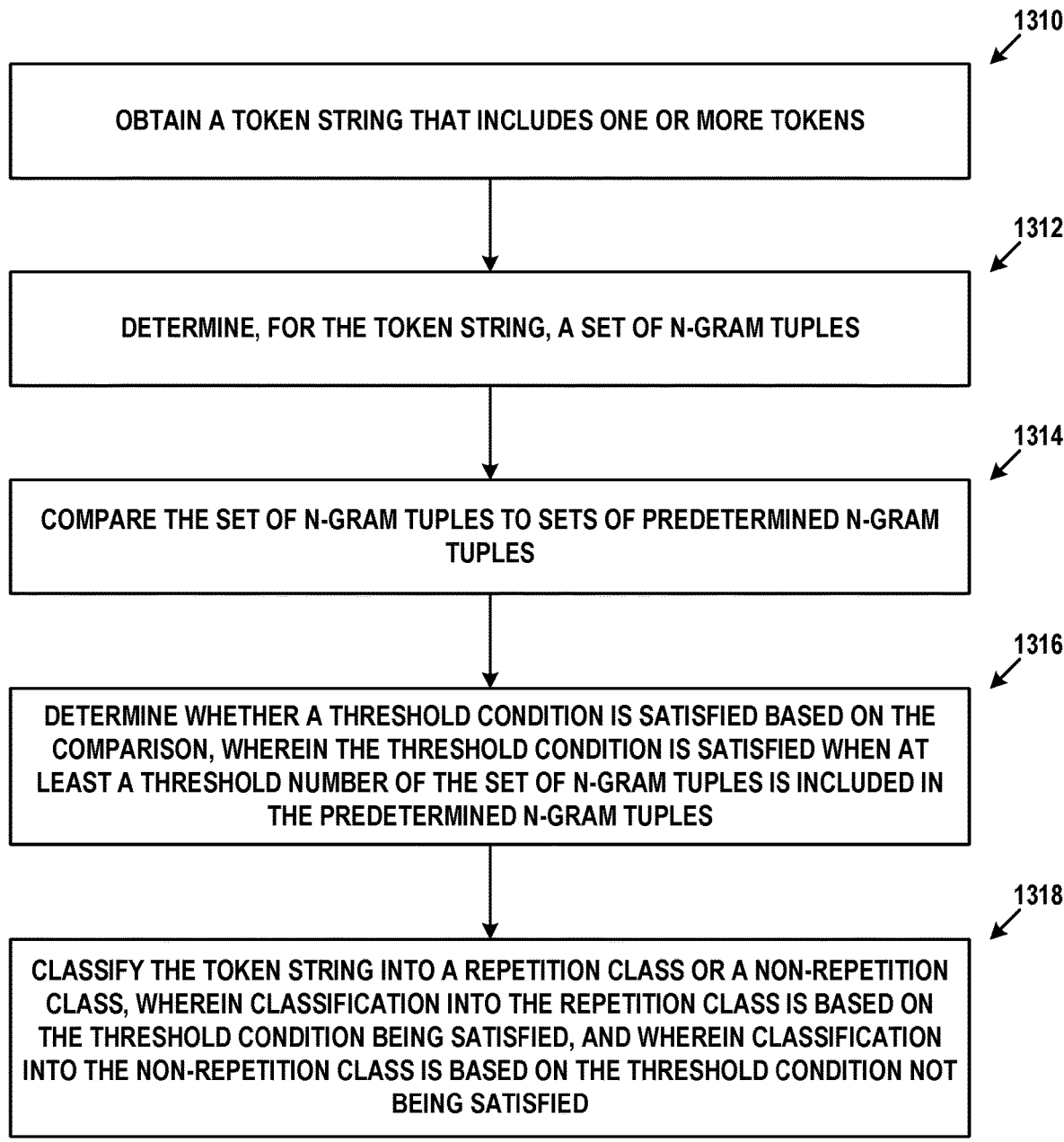
FIG. 13B is another flow chart, in accordance with example embodiments.

FIGS. 13A and 13B are flow charts illustrating example embodiments. The processes illustrated by FIGS. 13A and 13B may be carried out by a computing device, such as computing device 100, and/or a cluster of computing devices, such as server cluster 200. However, the processes can be carried out by other types of devices or device subsystems. For example, the processes could be carried out by a computational instance of a remote network management platform or a portable computer, such as a laptop or a tablet device.

The embodiments of FIGS. 13A and 13B may be simplified by the removal of any one or more of the features shown therein. Further, these embodiments may be combined with features, aspects, and/or implementations of one another and/or of any of the previous figures or otherwise described herein.

Block 1300 of FIG. 13A may involve obtaining textual content including a plurality of token strings, wherein each of the plurality of token strings includes one or more tokens.

Block 1302 may involve determining, for the plurality of token strings, respectively corresponding sets of n-gram tuples.

Block 1304 may involve assigning respective weights to the plurality of token strings, wherein, for each of the plurality of token strings, the assignment is based on the respectively corresponding set of n-gram tuples.

Block 1306 may involve identifying a subset of the plurality of token strings, wherein each of the subset of the plurality of token strings is characterized by a respective weight that exceeds a predetermined threshold weight.

Block 1308 may involve storing sets of n-gram tuples respectively corresponding to the subset of the plurality of token strings.

Some embodiments may further involve classifying a further token string into a repetition class or a non-repetition class based on a set of further n-gram tuples derived from the further token string and the sets of n-gram tuples as stored.

Some embodiments may further involve removing the further token string from training data when classified into the repetition class.

In some embodiments, the training data is used to train a machine-learning language model.

In some embodiments, classifying the further token string into the repetition class or the non-repetition class comprises: comparing the set of further n-gram tuples against the sets of n-gram tuples as stored; and determining whether a threshold condition is satisfied based on the comparison, wherein the threshold condition is satisfied when at least a threshold number of the set of further n-gram tuples is included in the sets of n-gram tuples as stored.

In some embodiments, classification into the repetition class is based on the threshold condition being satisfied, wherein classification into the non-repetition class is based on the threshold condition not being satisfied.

In some embodiments, there is exactly one of the respectively corresponding sets of n-gram tuples for each of the plurality of token strings.

In some embodiments, the respective weights are based on counts of the respectively corresponding sets of n-gram tuples.

In some embodiments, the plurality of token strings is from a data source, wherein the data source is a corpus of one or more of: email messages, incidents specifying technological problems experienced by users, security vulnerabilities detected in a device or network, knowledgebase documents, or configuration items.

Some embodiments may further involve, prior to determining the respectively corresponding sets of n-gram tuples, converting form text in the plurality of token strings into wildcard representations.

In some embodiments, the form text is a key-value pair separated by a delimiter, and wherein one of a key or a value in the key-value pair is replaced by a wildcard character or string in the wildcard representations.

In some embodiments, the token strings include sentences, wherein the tokens include words, and wherein the n-gram tuples are contiguous subsets of the words within the sentences.

Block 1310 of FIG. 13B may involve obtaining a token string that includes one or more tokens.

Block 1312 may involve determining, for the token string, a set of n-gram tuples.

Block 1314 may involve comparing the set of n-gram tuples to sets of predetermined n-gram tuples.

Block 1316 may involve determining whether a threshold condition is satisfied based on the comparison, wherein the threshold condition is satisfied when at least a threshold number of the set of n-gram tuples is included in the predetermined n-gram tuples.

Block 1318 may involve classifying the token string into a repetition class or a non-repetition class, wherein classification into the repetition class is based on the threshold condition being satisfied, and wherein classification into the non-repetition class is based on the threshold condition not being satisfied.

In some embodiments, the token string is obtained from textual content of training data, the embodiments further comprises removing the token string from the training data when classified into the repetition class.

In some embodiments, the training data is used to train a machine-learning language model.

In some embodiments, the set of n-gram tuples is independent of the predetermined n-gram tuples.

In some embodiments, the predetermined n-gram tuples were derived from textual content of a data source, and wherein the data source is a corpus of one or more of: email messages, incidents specifying technological problems experienced by users, security vulnerabilities detected in a device or network, knowledgebase documents, or configuration items.

Some embodiments may involve, prior to determining the set of n-gram tuples, converting form text in the token string into wildcard representations.

In some embodiments, the form text is a key-value pair separated by a delimiter, and wherein one of a key or a value in the key-value pair is replaced by a wildcard character or string in the wildcard representations.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   obtaining a token string that includes one or more tokens;
   determining, for the token string, a set of n-gram tuples;
   comparing the set of n-gram tuples to sets of predetermined n-gram tuples, wherein the predetermined n-gram tuples were selected based on an assigned weight exceeding a threshold weight;
   determining whether a threshold condition is satisfied based on the comparison, wherein the threshold condition is satisfied when at least a threshold number of the set of n-gram tuples is included in the predetermined n-gram tuples;
   classifying the token string into a repetition class or a non-repetition class, wherein classification into the repetition class is based on the threshold condition being satisfied, and wherein classification into the non-repetition class is based on the threshold condition not being satisfied;
   removing the token string from training data when classified into the repetition class; and
   training a machine learning model using the token string as training data when classified into the non-repetition class.

2. The method of claim 1, wherein the set of n-gram tuples is independent of the predetermined n-gram tuples.

3. The method of claim 1, wherein the predetermined n-gram tuples were derived from textual content of a data source, and wherein the data source is a corpus of one or more of: email messages, incidents specifying technological problems experienced by users, security vulnerabilities detected in a device or network, knowledgebase documents, or configuration items.

4. The method of claim 1, further comprising:
   prior to determining the set of n-gram tuples, converting form text in the token string into wildcard representations.

5. The method of claim 4, wherein the form text is a key-value pair separated by a delimiter, and wherein one of a key or a value in the key-value pair is replaced by a wildcard character or string in the wildcard representations.

6. The method of claim 1, wherein the assigned weight was based on counts of corresponding sets of n-gram tuples.

7. A non-transitory computer-readable medium, having stored thereon program instructions that, upon execution by a computing system, cause the computing system to perform operations comprising:
   obtaining a token string that includes one or more tokens;
   determining, for the token string, a set of n-gram tuples;
   comparing the set of n-gram tuples to sets of predetermined n-gram tuples, wherein the predetermined n-gram tuples were selected based on an assigned weight exceeding a threshold weight;
   determining whether a threshold condition is satisfied based on the comparison, wherein the threshold condition is satisfied when at least a threshold number of the set of n-gram tuples is included in the predetermined n-gram tuples;
   classifying the token string into a repetition class or a non-repetition class, wherein classification into the repetition class is based on the threshold condition being satisfied, and wherein classification into the non-repetition class is based on the threshold condition not being satisfied;
   removing the token string from training data when classified into the repetition class; and
   training a machine learning model using the token string as training data when classified into the non-repetition class.

8. The non-transitory computer-readable medium of claim 7, wherein the assigned weight was based on counts of corresponding sets of n-gram tuples.

9. The non-transitory computer-readable medium of claim 7, wherein the set of n-gram tuples is independent of the predetermined n-gram tuples.

10. The non-transitory computer-readable medium of claim 7, wherein the predetermined n-gram tuples were derived from textual content of a data source, and wherein the data source is a corpus of one or more of: email messages, incidents specifying technological problems experienced by users, security vulnerabilities detected in a device or network, knowledgebase documents, or configuration items.

11. The non-transitory computer-readable medium of claim 7, wherein the set of operations further comprises:
   prior to determining the set of n-gram tuples, converting form text in the token string into wildcard representations.

12. The non-transitory computer-readable medium of claim 11, wherein the form text is a key-value pair separated by a delimiter, and wherein one of a key or a value in the key-value pair is replaced by a wildcard character or string in the wildcard representations.

13. A system comprising:
   one or more processors; and
   memory, containing program instructions that, upon execution by the one or more processors, cause the system to perform operations comprising:
      obtaining a token string that includes one or more tokens;
      determining, for the token string, a set of n-gram tuples;
      comparing the set of n-gram tuples to sets of predetermined n-gram tuples, wherein the predetermined n-gram tuples were selected based on an assigned weight exceeding a threshold weight;
      determining whether a threshold condition is satisfied based on the comparison, wherein the threshold condition is satisfied when at least a threshold number of the set of n-gram tuples is included in the predetermined n-gram tuples;
      classifying the token string into a repetition class or a non-repetition class, wherein classification into the repetition class is based on the threshold condition being satisfied, and wherein classification into the non-repetition class is based on the threshold condition not being satisfied;
      removing the token string from training data when classified into the repetition class; and
      training a machine learning model using the token string as training data when classified into the non-repetition class.

14. The system of claim 13, wherein the assigned weight was based on counts of corresponding sets of n-gram tuples.

15. The system of claim 13, wherein the set of n-gram tuples is independent of the predetermined n-gram tuples.

16. The system of claim 13, wherein the predetermined n-gram tuples were derived from textual content of a data source, and wherein the data source is a corpus of one or more of: email messages, incidents specifying technological problems experienced by users, security vulnerabilities detected in a device or network, knowledgebase documents, or configuration items.

17. The system of claim 13, wherein the set of operations further comprises:
   prior to determining the set of n-gram tuples, converting form text in the token string into wildcard representations.

18. The system of claim 17, wherein the form text is a key-value pair separated by a delimiter, and wherein one of a key or a value in the key-value pair is replaced by a wildcard character or string in the wildcard representations.

* * * * *